(12) United States Patent
Bansal (10) Patent No.: US 10,939,073 B2
(45) Date of Patent: Mar. 2, 2021

(54) SYSTEM AND METHOD FOR PROVIDING A VIDEO CONFERENCING SETUP

(71) Applicant: Sanjay Bansal, Gurgaon (IN)

(72) Inventor: Sanjay Bansal, Gurgaon (IN)

( * ) Notice: Subject to any disclaimer, the term of this patent is extended or adjusted under 35 U.S.C. 154(b) by 0 days.

(21) Appl. No.: 16/651,227

(22) PCT Filed: Sep. 26, 2018

(86) PCT No.: PCT/IB2018/057447
§ 371 (c)(1),
(2) Date: Mar. 26, 2020

(87) PCT Pub. No.: WO2019/064194
PCT Pub. Date: Apr. 4, 2019

(65) Prior Publication Data
US 2020/0244924 A1 Jul. 30, 2020

(30) Foreign Application Priority Data
Sep. 26, 2017 (IN) .............................. 201711034134

(51) Int. Cl.
H04N 7/15 (2006.01)
G06F 3/01 (2006.01)
H04L 12/18 (2006.01)

(52) U.S. Cl.
CPC ............. H04N 7/152 (2013.01); G06F 3/012 (2013.01); H04L 12/1818 (2013.01)

(58) Field of Classification Search
CPC ... H04N 7/15; H04N 7/01; H04N 7/18; H04L 12/18; G06F 3/01

(Continued)

(56) References Cited

U.S. PATENT DOCUMENTS 5,222,737 A * 6/1993 Kazuk ................... A63F 7/0005
273/126 A
6,507,356 B1 1/2003 Jackel et al.
(Continued)

FOREIGN PATENT DOCUMENTS

EP          0008350      3/1980
WO    WO 2017/059254    4/2017

OTHER PUBLICATIONS

International Search Report of PCT/IB2018/057447 dated Jan. 1, 2019, 3 pages.
(Continued)

*Primary Examiner* — Melur Ramakrishnaiah
(74) *Attorney, Agent, or Firm* — Klarquist Sparkman, LLP (57) ABSTRACT

A method for providing a video conferencing setup is provided. The video conferencing setup has a table with a first and second portion, a display screen, an image capturing device and one or more participants positioned around the table. A height ($H_A$) of a line of sight of at least one participant of the one or more of participants is determined from a ground level. A maximum viewing distance ($D_M$) between the display screen and the at least one participant is determined. A height ($H_C$) of the image capturing device from the ground level is determined based on height ($H_A$) of line of sight and maximum viewing distance ($D_M$). A position of the display screen is determined based on the height ($H_C$) of the image capturing device. A length (X) of slope of top surface of second portion of the table is determined based on the display screen position.

10 Claims, 5 Drawing Sheets

(58) Field of Classification Search
USPC .......................................... 348/14.08–14.16
See application file for complete search history.

(56) References Cited

U.S. PATENT DOCUMENTS

| | | | |
|---|---|---|---|
| 7,126,627 B1 | 10/2006 | Lewis et al. | |
| 8,804,312 B2 | 8/2014 | Sugawara et al. | |
| 2009/0122132 A1* | 5/2009 | Thielman | H04N 9/12 348/14.08 |
| 2009/0207233 A1* | 8/2009 | Mauchly | H04N 7/15 348/14.09 |
| 2010/0118112 A1* | 5/2010 | Nimri | H04N 7/142 348/14.08 |
| 2012/0293692 A1* | 11/2012 | Namie | H04N 7/142 348/241 |
| 2017/0099454 A1* | 4/2017 | Duys | H04N 7/144 |

OTHER PUBLICATIONS

Written Opinion of PCT/IB2018/057447 dated Jan. 1, 2019, 5 pages.

* cited by examiner

FIG. 5

SYSTEM AND METHOD FOR PROVIDING A VIDEO CONFERENCING SETUP

CROSS-REFERENCE TO RELATED APPLICATIONS

This is the U.S. National Stage of International Application No. PCT/IB2018/057447, filed Sep. 26, 2018, which was published in English under PCT Article 21(2), which in turn claims the benefit of India Application No. 201711034134, filed Sep. 26, 2017. Both applications are incorporated by reference herein in their entirety.

TECHNICAL FIELD

The present disclosure relates generally to video conferencing systems. More specifically, the present disclosure relates to a system and method for providing a video conferencing setup.

BACKGROUND

Globalization has played a major role in growth of various industries across the world. It is therefore possible for a business entity to have its operations expanded globally. With the ever-increasing global network, there is a need to establish a communication mode, to connect the dispersed teams, located in their respective locations. Videoconferencing is one of the popular solutions, for teams and individuals to interact with one another, irrespective of their geographic locations. In past few years, video conferencing has become most effective way of conducting business meetings, seminars and colloquium, among others.

In a conventional videoconferencing system, the participants on either side communicate through the transmission of live video streams, captured by a camera installed on respective sides. The camera is located at the center of the screen displaying the video of the participants on the remote location. In few systems, the camera is located between two screens, first screen displays the video of the participants on the remote location second screen displays the content involved in the discussion, respectively. However, while engaged in a videoconference, due to positioning of camera, the participants are not able to make a proper eye contact. The misalignment of the camera with respect to the line of sight of the participant who focuses on the eye of the speaker, leads to poor communication among the video call participants as it appears to the far site participant that they while talking are not looking at them but looking somewhat 2-3 feet left or right and also appear to be either looking up or looking down. Also, in all video conferencing system implementations, the display system typically starts either from the top of the table or even further up from the table. Further, the far site participants video is captured in such a fashion that his hand and the table on which his hand is kept are to be shown. This table typically takes around 4 to 5 inches of the display space making the far site participants higher by near site table to the tune of 3 to 5 inches at the minimum and even 12 to 18 inches at the maximum. This also raises the lowest height at which the camera can be mounted on top of the display giving a feeling and impression to the far site participants that the near site participants are looking down at them. This roughly 2-3 feet left/right and roughly 4 inches to 18 inches above can be considered as horizontal and vertical astigmatism respectively which reduces the trust in video conferences. Consequently, important works are proposed for face to face meeting.

Therefore, there is a need for a system that provides enhanced videoconferencing experience with lowest horizontal and vertical astigmatism to all the participants.

SUMMARY

In an aspect of the present disclosure, a method for providing a video conferencing setup is provided. The video conferencing setup has a table with a first portion and a second portion, a display screen, an image capturing device and one or more participants positioned around the table. The method determines a height of a line of sight of at least one participant of the one or more of participants from a ground level. The method further determines a maximum viewing distance between the display screen and the at least one participant. Furthermore, the method determines a height of the image capturing device from the ground level based on the height of the line of sight and the maximum viewing distance. Moreover, the method determines a position of the display screen based on the determined height of the image capturing device. The method further determines a length of slope of top surface of second portion of the table based on the determined position of display screen.

In another aspect of the present disclosure, a video conferencing system is provided. The system includes a table with one or more participants positioned around the table, a display screen, an image capturing device and a processing unit. The table has a first end and a second end. The table further includes a first portion having a top surface extending between the second end and an intermediary point between the first end and the second end. The table further includes a second portion having a top surface extending between the intermediary point and the first end. The display screen defines a top end and is positioned at the first end of the table. The image capturing device positioned at the top end of the display screen. The processing unit determines a height of a line of sight of at least one participant of the one or more of participants from a ground level. The processing unit further determines a maximum viewing distance between the display screen and the at least one participant. Furthermore, the processing unit determines a height of the image capturing device from the ground level based on the height of the line of sight and the maximum viewing distance. Moreover, the processing unit determines a position of the display screen based on the determined height of the image capturing device. The processing unit further determines a length of slope of top surface of second portion of the table based on the determined position of display screen.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
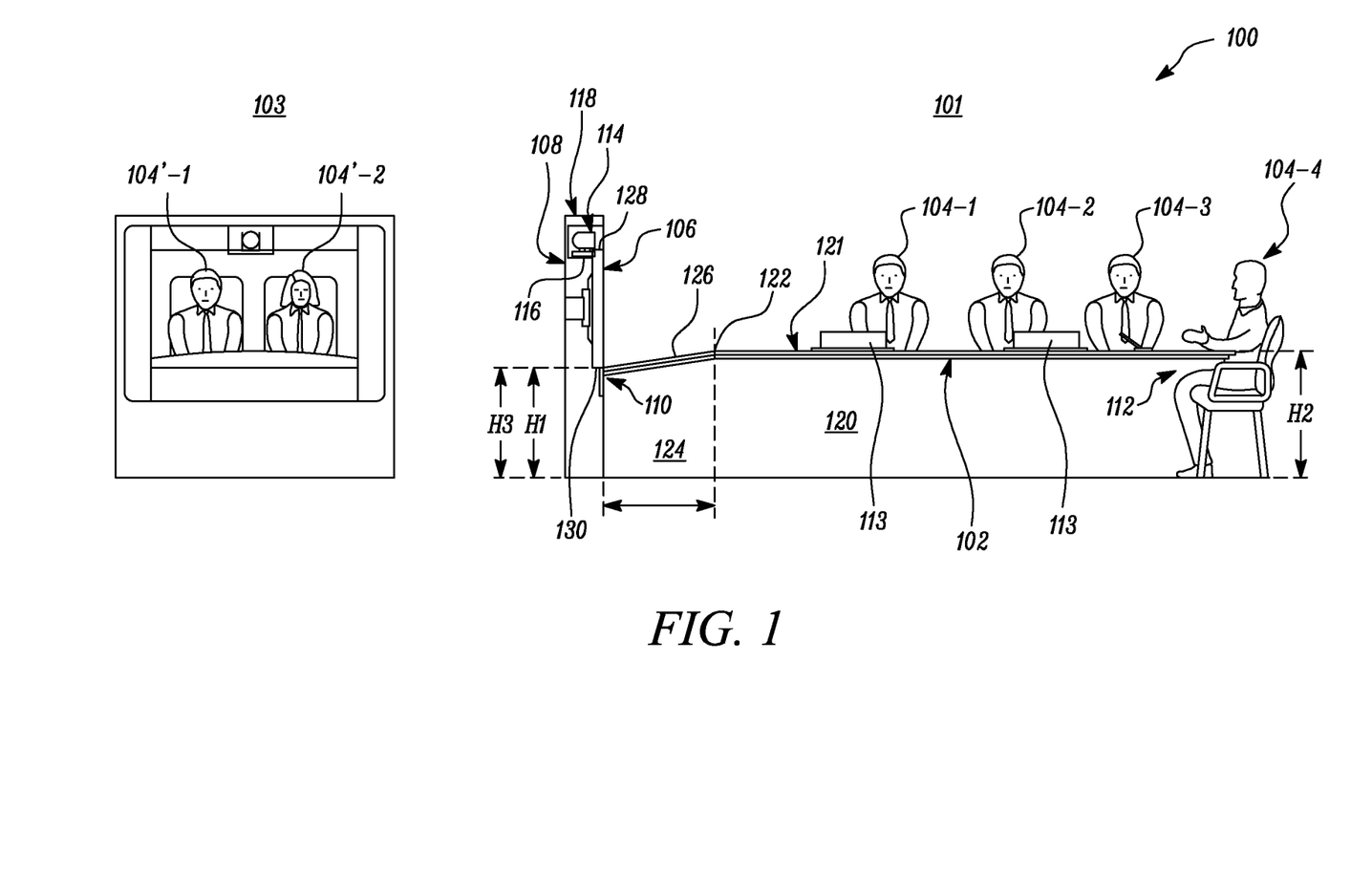
FIG. 1 illustrates an exemplary system for video conferencing, in accordance with the concepts of the present disclosure.
Figure 2:
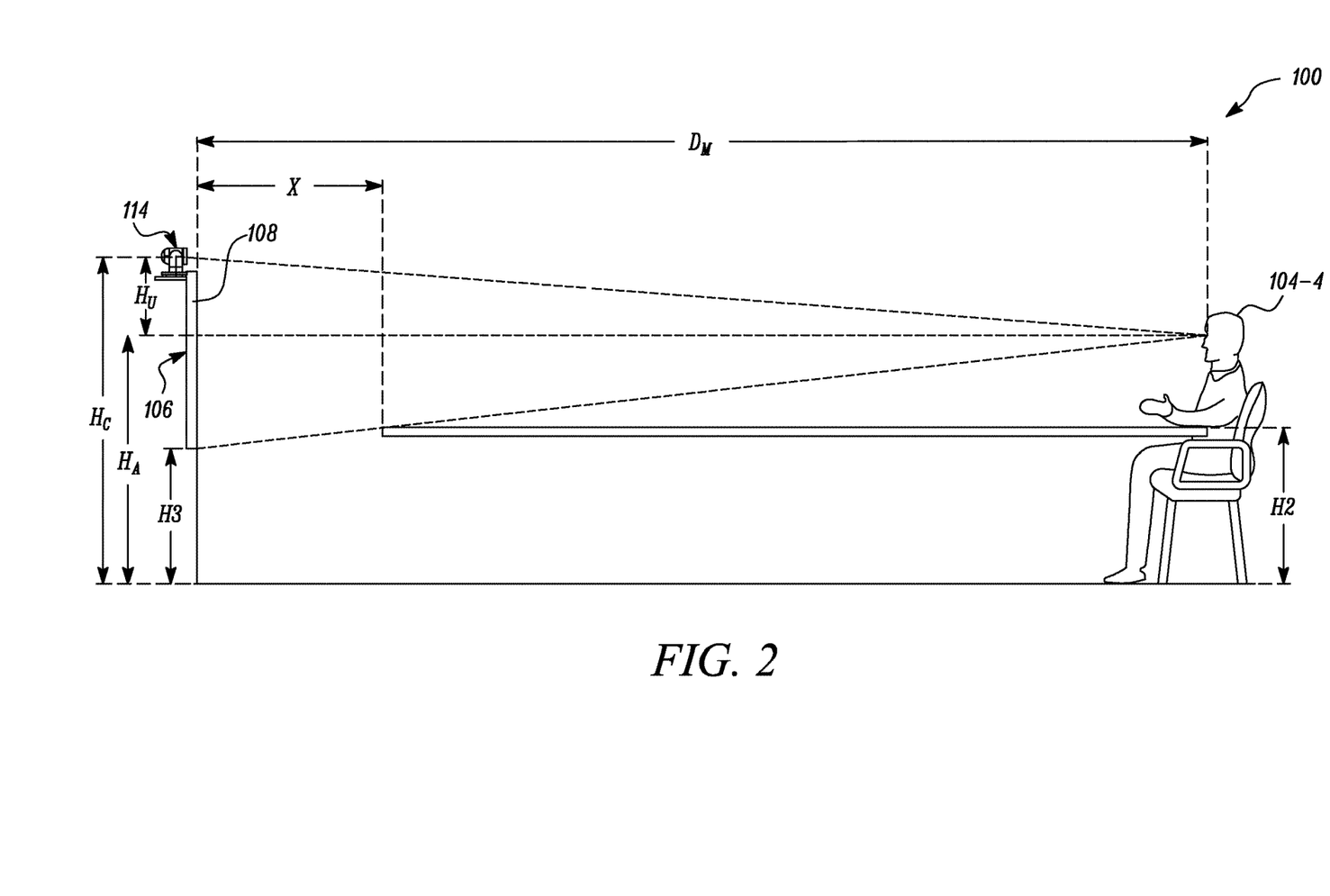
FIG. 2 illustrates an exemplary video conferencing room with camera setup within the system for video conferencing, in accordance with the concepts of the present disclosure.
Figure 3:
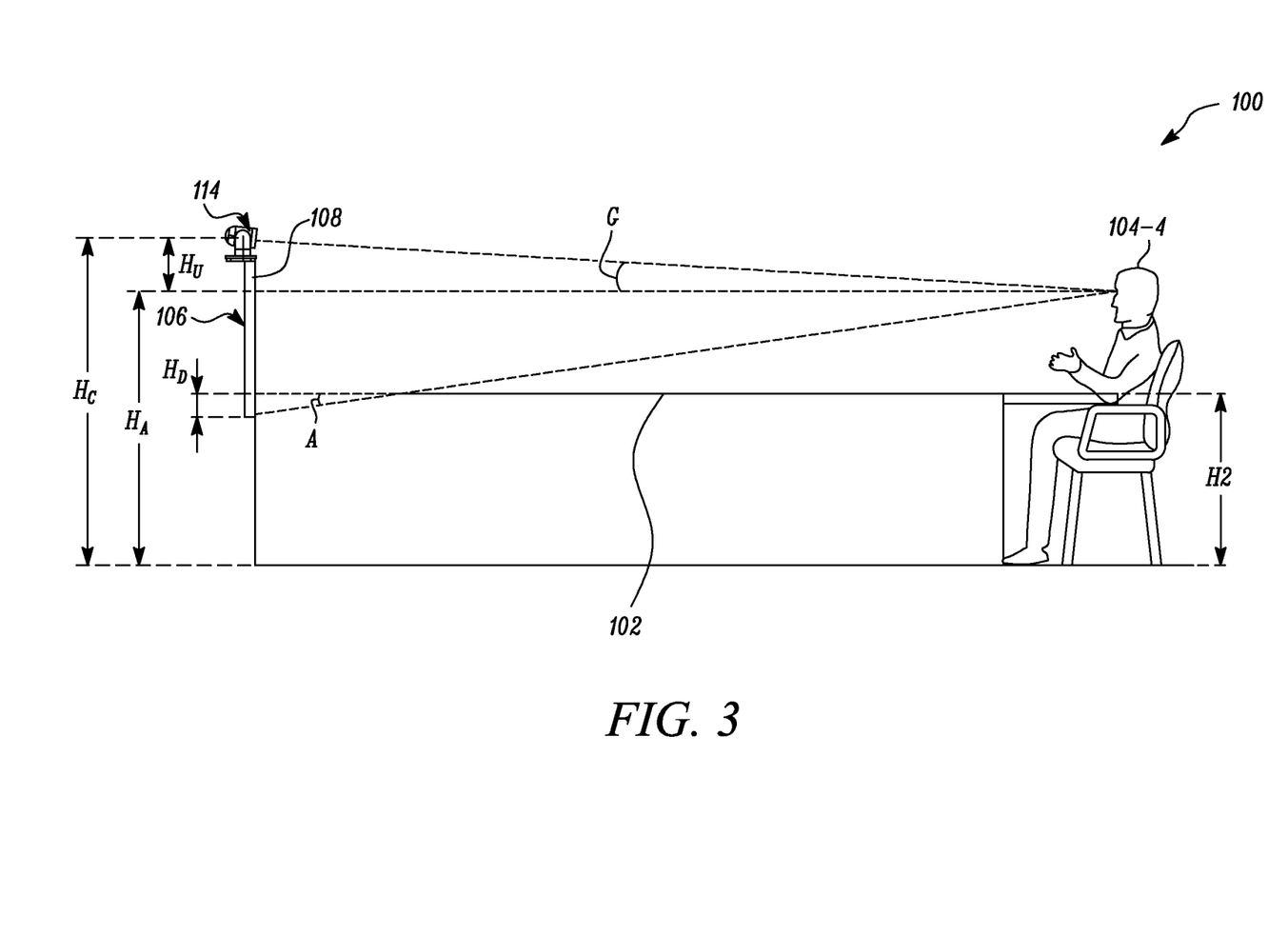
FIG. 3 illustrates an exemplary video conferencing room with table and display positioning and setup within the system for video conferencing, in accordance with the concepts of the present disclosure.

FIG. 1 illustrates an exemplary system 100 for providing video conferencing between multiple locations, such as a first location 101 and a second location 103. The first location 101 and the second location 103 may be conference rooms at remote geographic locations with respect to each other. Alternatively, the first location 101 and the second location 103 may be at the same geographic location, such as in same building but remotely located with respect to each other. In an exemplary embodiment of the present disclosure, the system 100 is implemented for business communication purposes. However, other implementations of the system 100 may also be envisioned, without limiting the scope of the present disclosure.

As illustrated in FIG. 1, the first location 101 includes a conference table 102, one or more participants 104, such as participants 104-1, 104-2 . . . 104-n (hereinafter collectively referred to as the participants 104), and a display screen 106 mounted on a display assembly stand 108. The table 102 includes a first end 110 and a second end 112, such that the display screen 106 is positioned at the first end 110 of the table 102 and a participant 104, such as the participant 104-4 is positioned on the second end 112 of the table 102.

In an embodiment, the display screen 106 is used to display video of the participants 104-1 and 104-2 located at the second location 103 as shown in FIG. 1. Therefore, the display screen 106 facilitates video interaction among the participants 104 in the video conferencing setup. As explained previously, the display screen 106 is mounted on the display assembly stand 108 and is common for all the participants 104 seated inside a particular location. For example, the first location 101 has a common display screen 106 for all the participants 104 seated therein, and similarly, the second location 103 has a separate common display screen 106 for the participants 104 seated therein. In an embodiment, the display assembly stand 108 is attached to the table 102. For example, the display assembly stand 108 may be rigidly fixed with the table 102 or detachably fixed to the table 102. Alternatively, the display assembly stand 108 may be detached from the table 102 such that the table 102 and the display assembly stand 108 simply abut each other.

In an exemplary embodiment of the present disclosure, the system 100 further includes a number of content viewing monitors 113 provided for every participant 104 seated on the table 102 inside the first location 101. For example, the content viewing monitors 113 may be used by the participants 104 to view content, such as a document, presentation, whiteboard etc., during the video conferencing. In one example, the content viewing monitors 113 may be affixed or embedded inside the top surface of the table 102.

The display assembly stand 108 further includes an image capturing device 114 having a mounting assembly 116. The image capturing device 114 may be positioned via the mounting assembly 116 at a top 118 of the display assembly stand 108 and behind the display screen 106, such that the image capturing device 114 is not obstructed by the display screen 106. In an exemplary embodiment of the present disclosure, the image capturing device 114 is a video camera configured to capture video recording of the first location 101, the table 102 and the participants 104.

Further, the table 102 includes a first portion 120 having a top surface 121 ending at an intermediary point 122 and a second portion 124 having a top surface 126 extending from the intermediary point 122 towards the first end 110. In an embodiment, a height H1 of the second portion 124 of the table 102 at the first end 110 from the ground is less than a height H2 of the table 102 at the second end 112 through the intermediary point 122 from the ground. Therefore, the second portion 124 of the table 102 includes the top surface 126 forming a slope at an angle A with respect to the top surface 121 of the first portion 120 of the table 102, as shown in FIG. 1.

Further, according to an embodiment of the present disclosure, the display screen 106 includes a top end 128 and a bottom end 130, such that the bottom end 130 is positioned at a height H3 from the ground which is equal to the height H1 of the table 102 at the first end 110. In one example, the bottom end 130 of the display screen 106 rests on or abuts the top surface 126 of the table 102 at the first end 110. In another example, the display assembly stand 108 is spaced apart from the table 102 and the bottom end 130 of the display screen 108 does not abut the top surface 126 of the table 102.

In an embodiment, a length X of the slope of the top surface 126 of the second portion 124 and the height H1 of the table 102 at the first end 110 and/or the height H3 at which the bottom end 130 of the display screen 106 is positioned, are determined based on one or more parameters associated with the participants 104, the image capturing device 114, a maximum viewing distance of the participant 104 from the display screen 106, size of the display screen 106, height of image, and height H2 of the table 102 at the second end 112. The determination of the length X and height H1 is further described in greater detail with reference to FIG. 4

The foregoing description is provided in conjunction to only the first location 101, however, it may be contemplated that the description is also applicable to any video conferencing setup, such as at the second location 103.

INDUSTRIAL APPLICABILITY

Figure 4:
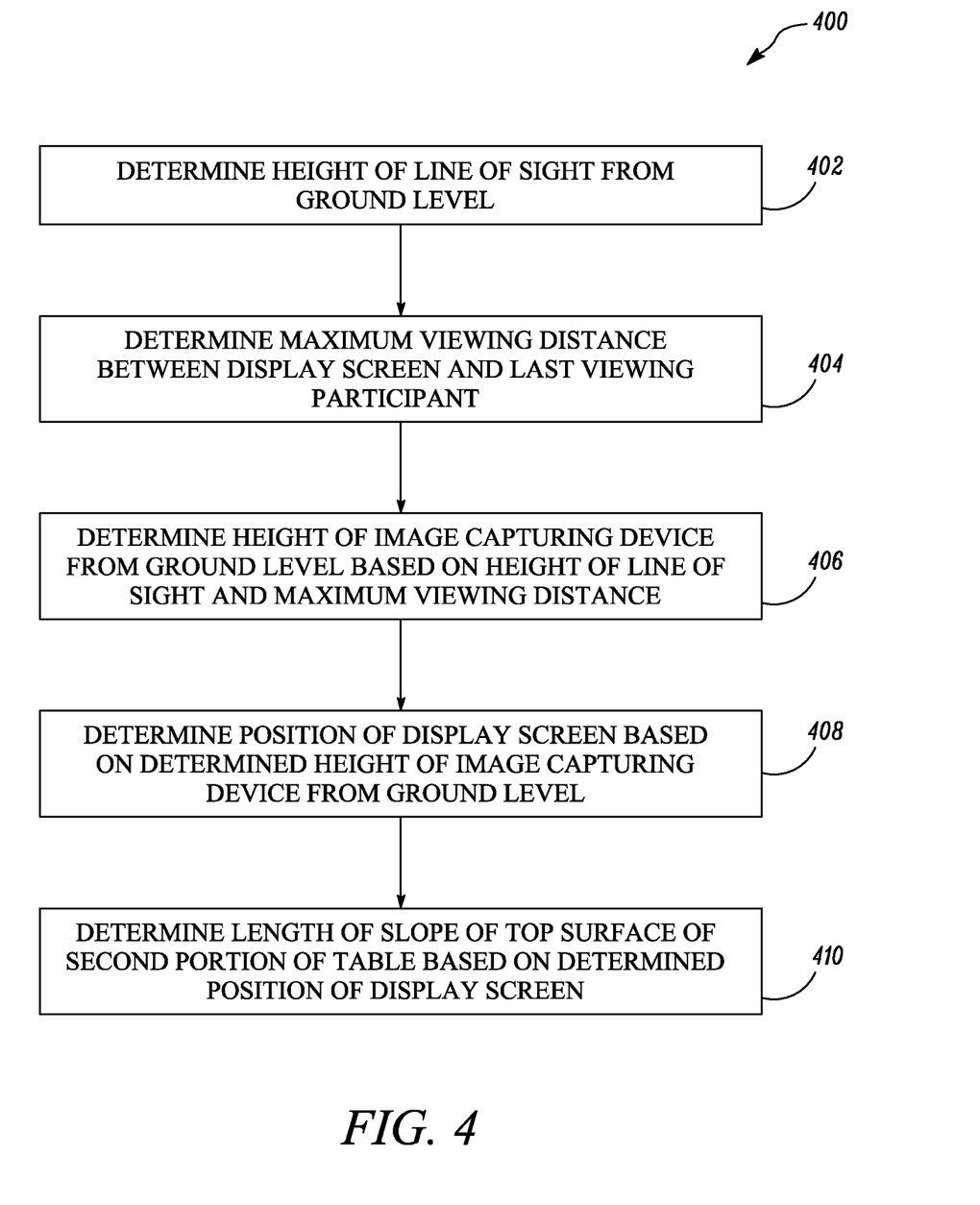
FIG. 4 illustrates an exemplary method for providing a video conferencing setup, in accordance with the concepts of the present disclosure.
Figure 5:
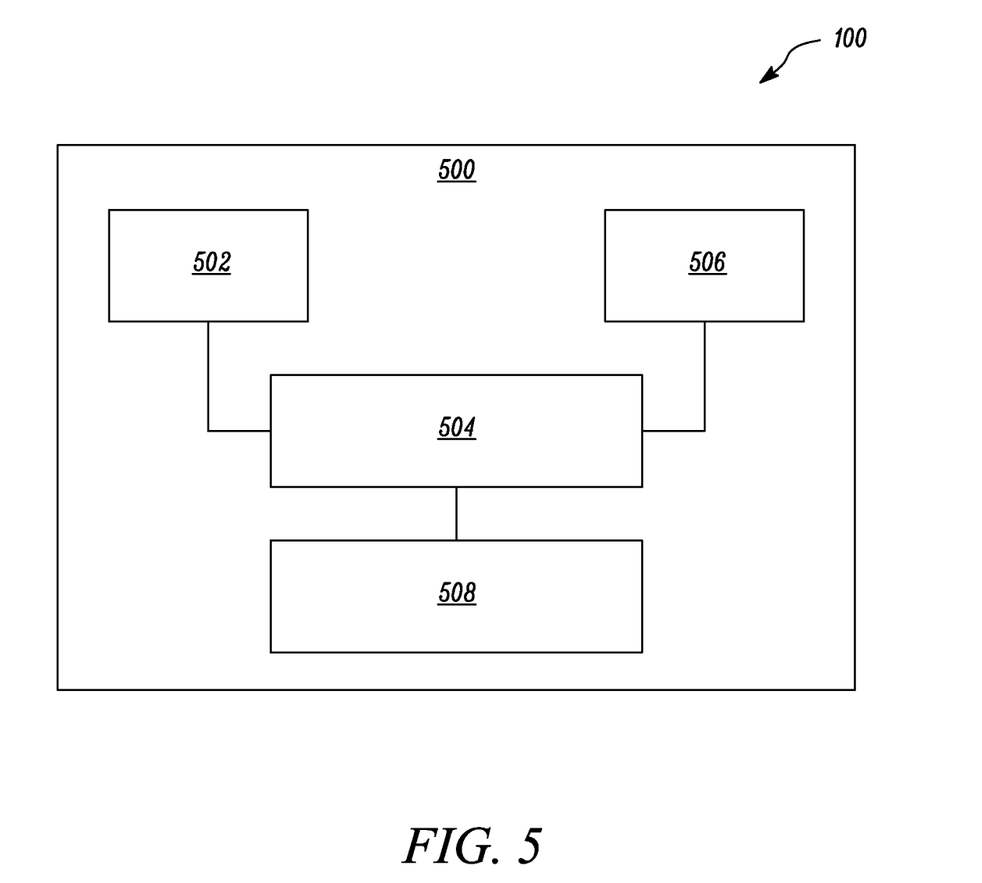
FIG. 5 illustrates a block diagram of an exemplary control system for providing the video conferencing setup, in accordance with the concepts of the present disclosure.

FIG. 4 illustrates an exemplary method 400 for providing video conferencing setup, according to an embodiment of the present disclosure. FIG. 5 illustrates a control system 500 for implementing the system 100 for providing video conferencing setup, according to an embodiment of the present disclosure. For the purposes of clarity, method 400 is described herein in conjunction to FIGS. 1 to 5. The system 100 and the method 400 may be implemented by the computer implemented control system 500. The control system 500 includes an Input/Output unit 502, hereinafter referred to as I/O unit 502, and a processing unit 504. The processing unit 504 may include a microprocessor connected to a communication bus (not shown). The control system 500 also includes a memory 506. The memory 506 may be Random Access Memory (RAM) or Read Only Memory (ROM). The control system 500 further includes a storage device, which may be a hard-disk drive or a removable storage drive, such as, a floppy-disk drive, optical-disk drive, and the like. The storage device may also be a means for loading computer programs or other instructions into the computer system. The control system 500 further includes a transceiver unit 508 configured to facilitate communication between the video conferencing systems located at different locations (such as the first location 101 and the second location 103), over a network (not shown).

At step 402, one or more parameters are received. The one or more parameters include, but not limited to, a height $H_A$ of line of sight of the participant 104 seated at the second end 112 of the table 102, from the ground, a maximum viewing distance $D_M$ between the display screen 106 and the participant 104-4 seated at the second end 112 of the table 102, a height of the image displayed on the display screen 106, size of the display screen 106, and number of participants in the conference room.

At step 404, a desired height $H_C$ of the image capturing device 114 from the ground is determined based on the received parameters. In one exemplary embodiment, initially, height of the image capturing device 114 above the line of sight level of the participant 104-4 seated at the second end 112 is determined and based on the determined value, the desired height $H_C$ of the image capturing device 114 from the ground is determined. Furthermore, based on the determined desired height $H_C$ of the image capturing device 114, the position of display screen 106 is determined at step 406.

Consider the following example:
For a conference room with a 65" display screen 106 size and 14 participants—
Display Size: 65" LED
Height of Image: 809 mm
Maximum Viewing Distance $D_M$: 809×6=4854 mm (=rounded off 4900 mm)
$H_A$=1200 mm
As camera is placed behind the display screen 106 of thickness 50 mm, the effective maximum viewing distance $D_M$ in this case will be 4950 mm (4900+50).
$H_U$=Camera Centre Height from $H_A$ (1200 mm from ground)
For allowing maximum 4 degree of Gaze angle G, the height of camera above eye level:

$$\tan 4° = H_U / 4900$$
$$H_U = \tan 4° \times 4950$$
$$H_U = 0.076 \times 4950$$
$$= 376.2 \text{ mm } (= \text{rounded off } 377 \text{ mm})$$

Total height from Ground level ($H_C$)=1200+377=1577 mm
Height of Camera Center from base plate of Camera=72 mm
And Height of display screen 106=856 mm
Height H3 of the bottom end 130 of the display screen 106 from the ground=1577−(72+856)=649 mm
Therefore, in this example, according to the above relation, the bottom end 130 of the display screen 106 is to be positioned at a height H3 of 649 mm from the ground.

Furthermore, at step 408, length X of the slope of the top surface 126 of the second portion 124 of the table is determined based on the determined height H3 of the bottom portion 130 of the display screen 106 from the ground. In the above-mentioned example,
Height H2 of the table 102 at the second end 112=750 mm
Height H1 of the table 102 at the first end 110 will be equal to the height H3, which is 649 mm. Therefore, the difference $H_D$ between H2 and H1 is 101 mm, which is rounded off to 100.

Similar to the above, $H_D$ may be determined for various other values as follows:

| Size of Table (no. of seats) | Length of Table, L (in mm) | Display Size (diagonal in inches) | Mini. Height below Table Level (in mm) $H_D$ | Actual Height selected below Table level 9 (in mm), Rounded off $H_D$ |
|---|---|---|---|---|
| 4 seater Table | 1400 | 40 | 62.15 | 67 |
| 6 seater Table | 2150 | 48 | 74.58 | 87 |
| 8 seater Table | 3000 | 55 | 85.46 | 87 |
| 10 seater Table | 3785 | 55 | 85.46 | 100 |
| 14 seater Table | 4900 | 65 | 101 | 100 |

For viewing the lowest portion of the display screen 106 which starts from a height $H_D$ (101 mm) below height H2 of the table 102 at the second end 112 (i.e., 750 mm), the line of sight from viewer intersects the top surface 121 of the first portion 120 of the table 102 to define the position of intermediary point 122.

$H_D$=Height of Display under the table top surface for 65" display screen 106=101.
Considering the bezel thickness 12 mm, effective $H_D$=101−12=89 mm
$H_E$=Height of Eye Level above Table, i.e. 1200−750=450 mm
X=Distance of intersection point from display screen 106, which is equal to the length of the slope of the top surface 126 of the second portion 124 of the table 102.
L−X=Distance of Person from intersection point.
L=Length of Table, i.e. maximum viewing distance $D_M$ 4900 mm in case of combination of 65" display screen 106.

$$X = H_D * L/(H_E + H_D)$$

Here, $H_D$=101, $H_E$=450, L=4900;
Therefore, $$X = 100 \times 4900/(450 + 100) = 890.9 \text{ mm}$$

Similar to the above, X may also be determined for various other values as follows:

| Size of Table (no of seats) | Length of Table, L (in mm) | Display Size (diagonal in inches) | Distance of slope on table, (in mm) X | Actual Distance of slope on table, (in mm) X |
|---|---|---|---|---|
| 4 seater Table | 1400 | 40 | 181.43 | 200 |
| 6 seater Table | 2150 | 48 | 348.32 | 350 |
| 8 seater Table | 3000 | 55 | 486.03 | 500 |
| 10 seater Table | 3785 | 55 | 619.11 | 660 |
| 14 seater Table | 4900 | 65 | 890.9 | 900 |

The system 100 and the method 400 of the present disclosure to provide video conferencing setup enhances the experience of the participants 104 involved in a video teleconference. The implementation of the system disclosed herein, eliminates the problems of poor eye contact, misaligned images and poor visibility of the far seated participant, during the video conference.

While aspects of the present disclosure have been particularly shown, and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

LIST OF ELEMENTS

100 System for videoconferencing setup
101 First location
102 Table
103 Second Location
104 Participant
106 Display screen
108 Display Assembly stand
110 First end of the table
112 Second end of the table
113 Content viewing monitor
114 Image capturing device
116 Mounting assembly on the display assembly stand
118 Top of the display assembly stand
120 First portion of the table
121 Top surface of the first portion of the table
122 Intermediary point
124 Second portion of the table
126 Top surface of the second portion of the table
128 Top end of the display screen
130 Bottom end of the display screen
400 Method
402 Step
404 Step
406 Step
408 Step
410 Step
500 Control System
502 Input/Output unit
504 Processing unit
506 Memory
508 Transceiver unit
Angle A Angle at which the slope of the second portion in inclined with respect to the top surface of the first portion of the table.
G Gaze angle
H1 Height of the second portion of the table at the first end from the ground
H2 Height of the table at the second end from the ground
H3 Height of the bottom end of the display screen from the ground.
$H_A$ Height of line of sight of the participant seated at the table from the ground
$H_C$ Height of the image capturing device from the ground
$H_D$ Height of display screen under the table top surface
$H_U$ Camera center height from $H_A$
$D_M$ Maximum viewing distance between the display screen and the participant
X Length of the slope of the top surface of the second portion of the table
L Length of the table, i.e. maximum viewing distance

I claim:

1. A method for providing a video conferencing setup (100), the video conferencing setup (100) having a table (102) having a first portion (120) and a second portion (124) defining a first end (110) and a second end (112) of the table (102), a display screen (106) defining a bottom end, an image capturing device (114) and one or more participants (104) positioned around the table (102), the method comprising:
    determining, by a processing unit (504), a height ($H_A$) of a line of sight of at least one participant (104) of the one or more of participants (104) from a ground level;
    determining, by the processing unit (504), a maximum viewing distance ($D_M$) between the display screen (106) and the at least one participant (104);
    determining, by the processing unit (504), a height ($H_C$) of the image capturing device (114) from the ground level based on the height of the line of sight ($H_A$) and the maximum viewing distance ($D_M$);
    determining, by the processing unit (504), a position of the display screen (106) based on the determined height ($H_C$) of the image capturing device (114); and
    determining, by the processing unit (504), a length (X) of slope of top surface (126) of second portion (124) of the table (102) based on the determined position of display screen (106), wherein the slope of the top surface (126) is defined by a height H1 of the second portion (124) of the table (102) at the first end (110) from the ground level being less than a height H2 of the first portion (120) of the table (102) at the second end (112) from the ground level; and
    wherein the position of the display screen (106) is determined such that the bottom end aligns with the top surface (126) of the second portion (124) at the first end (110) of the table (102).

2. The method as claimed in claim 1, wherein the at least one participant (104) is positioned at a maximum distance from the display screen (106).

3. The method as claimed in claim 1, wherein the height ($H_C$) of the image capturing device (114) is determined based on one or more of a height of an image displayed on the display screen (106), a size of the display screen (106), and a number of participants (104) in the video conferencing system (100).

4. The method as claimed in claim 1, wherein the bottom end (130) is positioned at a height H3 from the ground level, and wherein the length X of the slope of top surface (126) of second portion (124) of the table (102) is based on the height H3 of the bottom end (130) of the display screen (106).

5. A video conferencing system (100) comprising:
    a table (102) and one or more participants (104) positioned around the table (102), wherein the table (102) includes:
        a first end (110) and a second end (112),
        a first portion (120) having a top surface (121) extending between the second end (112) and an intermediary point (122) between the first end (110) and the second end (112),
        a second portion (124) having a top surface (126) extending between the intermediary point (122) and the first end (110), wherein a height H1 of the second portion (124) of the table (102) at the first end (110) from the ground level is less than a height H2 of the first portion (120) of the table (102) at the second end (112) from the ground level thereby forming a slope of the top surface (126) of the second portion (124);

a display screen (106) defining a top end and a bottom end, the display screen (106) being positioned at the first end (110) of the table (102), wherein the bottom end of the display screen (106) aligns with the top surface (126) of the second portion (124) at the first end (110) of the table (102);

an image capturing device (114) positioned at the top end of the display screen (106); and a processing unit (504) configured to:
determine a height ($H_A$) of a line of sight of at least one participant (104) of the one or more of participants (104) from a ground level;

determine a maximum viewing distance $D_M$ between the display screen (106) and the at least one participant (104);

determine a height $H_C$ of the image capturing device (114) from the ground level based on the height of the line of sight ($H_A$) and the maximum viewing distance ($D_M$);

determine a position of the display screen (106) based on the determined height ($H_C$) of the image capturing device (114);

determine a length (X) of the slope of top surface (126) of the second portion (124) of the table (102) based on the determined position of display screen (106).

6. The system (100) as claimed in claim 5, wherein the top surface (126) of the second portion (124) of the table (102) forms the slope at an angle (A) with respect to the top surface (121) of the first portion (120) of the table (102).

7. The system (100) as claimed in claim 5, wherein height ($H_C$) of the image capturing device (114) is based on at least one of a height of the image displayed on the display screen (106), size of the display screen (106), and number of participants in the video conferencing setup (100).

8. The system (100) as claimed in claim 5, wherein the bottom end (130) is positioned at a height H3 from the ground level, and wherein the length X of the slope of top surface (126) of second portion (124) of the table (102) is based on the height H3 of the bottom end (130) of the display screen (106).

9. The system (100) as claimed in claim 5, comprising a plurality of content viewing monitors (113) placed on the table (102).

10. One or more non-transitory computer-readable media having encoded thereon computer-executable instructions that, when executed, cause a computing system to perform a method of providing a video conferencing setup, the video conferencing setup having a table having a first portion and a second portion defining a first end and a second end of the table, a display screen defining a bottom end, an image capturing device and one or more participants positioned around the table, the method comprising:

determining, by a processing unit, a height ($H_A$) of a line of sight of at least one participant of the one or more of participants from a ground level;

determining, by the processing unit, a maximum viewing distance ($D_M$) between the display screen and the at least one participant;

determining, by the processing unit, a height ($H_C$) of the image capturing device from the ground level based on the height of the line of sight ($H_A$) and the maximum viewing distance ($D_M$);

determining, by the processing unit, a position of the display screen based on the determined height ($H_C$) of the image capturing device; and determining, by the processing unit, a length (X) of slope of top surface of second portion of the table based on the determined position of display screen, wherein the slope of the top surface is defined by a height H1 of the second portion of the table at the first end from the ground level being less than a height H2 of the first portion of the table at the second end from the ground level; and wherein the position of the display screen is determined such that the bottom end aligns with the top surface of the second portion at the first end of the table.

* * * * *